US011271657B2

(12) United States Patent
Coli et al.

(10) Patent No.: US 11,271,657 B2
(45) Date of Patent: *Mar. 8, 2022

(54) SIGNALING ON A HIGH-SPEED DATA CONNECTOR

(71) Applicant: II-VI DELAWARE, INC., Wilmington, DE (US)

(72) Inventors: Giuliano Coli, Sunnyvale, CA (US); Stephen Nelson, Santa Clara, CA (US); Henry Meyer Daghighian, Redwood City, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 416 days.

This patent is subject to a terminal disclaimer.

(21) Appl. No.: 16/195,739

(22) Filed: Nov. 19, 2018

(65) Prior Publication Data

US 2019/0132053 A1 May 2, 2019

Related U.S. Application Data

(63) Continuation of application No. 15/648,929, filed on Jul. 13, 2017, now Pat. No. 10,135,538.

(Continued)

(51) Int. Cl.
*H04B 10/50* (2013.01)
*H04B 10/60* (2013.01)
(Continued)

(52) U.S. Cl.
CPC ......... *H04B 10/501* (2013.01); *H01R 12/716* (2013.01); *H04B 10/40* (2013.01); *H04B 10/60* (2013.01)

(58) Field of Classification Search
CPC ........ H04B 10/50; H04B 10/60; H04B 10/40; H04B 10/43; H04B 10/501–505;
(Continued)

(56) References Cited

U.S. PATENT DOCUMENTS 4,893,332 A * 1/1990 Brown ................. H04M 11/002
340/870.02
5,745,274 A * 4/1998 Fatehi ................ H04B 10/0773
398/175

(Continued)

*Primary Examiner* — Oommen Jacob
(74) *Attorney, Agent, or Firm* — Blank Rome LLP

(57) ABSTRACT

An apparatus and method for signaling and transmitting data through an optical link is described. The apparatus may include a connector including a first plurality of contacts compatible with an enhanced SFP (SFP+) connector. The connector further includes an additional contact formed at a space adjacent to the first plurality of contacts. A tone generator couples to the additional contact to receive a first signal and to generate a first distinct tone indicative of the first signal for transmission via the additional contact. The method may include generating a first distinct tone indicative of a first signal providing control or status of an apparatus and transmitting or receiving a differential data signal over a portion of a first plurality of contacts compatible with an enhanced SFP (SFP+) connector. The first distinct tone is transmitted over the additional contact formed in a space adjacent to the first plurality of contacts.

21 Claims, 11 Drawing Sheets

Related U.S. Application Data

(60) Provisional application No. 62/370,118, filed on Aug. 2, 2016.

(51) Int. Cl.
*H04B 10/40* (2013.01)
*H01R 12/71* (2011.01)

(58) Field of Classification Search
CPC ............ H04B 10/564; H04B 10/07955; H04B 10/505; H04B 10/50575; H04B 10/54; H04B 10/58; H04B 10/504; H04B 10/25754; H04J 14/0221; H04J 14/0246; H04J 14/025
See application file for complete search history.

(56) References Cited

U.S. PATENT DOCUMENTS

| | | | | |
|---|---|---|---|---|
| 2003/0128115 A1* | 7/2003 | Giacopelli | .......... | H04L 12/2854 340/506 |
| 2003/0237037 A1* | 12/2003 | Soundararajan | ... | H04B 17/0085 714/748 |
| 2004/0109685 A1* | 6/2004 | Wan | .................... | H04J 14/0221 398/41 |
| 2004/0225418 A1* | 11/2004 | Barrenscheen | ........... | H04L 1/24 701/1 |
| 2009/0154918 A1* | 6/2009 | Hinderthuer | ....... | H04Q 11/0005 398/9 |
| 2010/0027991 A1* | 2/2010 | Hosking | ................ | H04B 10/07 398/9 |
| 2010/0028015 A1* | 2/2010 | Hosking | ................ | H04B 10/40 398/135 |
| 2010/0054734 A1* | 3/2010 | Hosking | ............ | H04B 10/2589 398/25 |
| 2011/0192226 A1* | 8/2011 | Hayner | ............. | G01C 19/5776 73/504.12 |
| 2014/0072306 A1* | 3/2014 | Sridhar | ............... | H04J 14/0275 398/79 |
| 2014/0248059 A1* | 9/2014 | Tang | .................... | H04L 49/352 398/136 |
| 2015/0093117 A1* | 4/2015 | Rahn | .................... | H04B 10/588 398/115 |

* cited by examiner

SIGNALING ON A HIGH-SPEED DATA CONNECTOR

CROSS-REFERENCE TO RELATED APPLICATION

This application is a Continuation of U.S. patent application Ser. No. 15/648,929, filed Jul. 13, 2017, titled SIGNALING ON A HIGH-SPEED DATA CONNECTOR, which claims the benefit of and priority to the Aug. 2, 2016 filing date of the U.S. Patent Provisional Application No. 62/370,118, titled SIGNALING ON A HIGH-SPEED DATA CONNECTOR (the '118 Provisional Application), is hereby made pursuant to 35 U.S.C. § 119(e).

FIELD

Some embodiments described herein generally relate to signaling over high-speed bidirectional data connectors.

BACKGROUND

Unless otherwise indicated herein, the materials described herein are not prior art to the claims in the present application and are not admitted to be prior art by inclusion in this section.

Electro-Optical transceivers, such as Enhanced Small Form-factor Pluggable (SFP+)transceivers, generally include a host device electrical connector for communicatively connecting the transceiver module to the host device. The host connector is conventionally in the form of an edge connector including an arrangement of exposed, conductive surfaces (or "pins"). The connector includes a standardized arrangement of pins with some of the pins used for actual high speed data transmission, other pins are used for low speed data communication while other pins are used for status and control. As data rate demands increase, there is a need for re-assigning some of the status and control pins to the traffic high speed data transmission, thus requiring alternative ways to use the fewer pins for status and control functionalities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to signaling and multi-channel data communication through single or multiple electrical lanes, or one or more optical links, or one or more wavelengths.

In an example embodiment, a method of signaling and transmitting data through an electrical connection is described. The method may include generating a first distinct tone indicative of a first signal providing one of control or status of an apparatus. The apparatus is configured to at least transmit or receive a differential data signal over a portion of a first plurality of contacts compatible with an enhanced SFP (SFP+) connector. The method may further include transmitting the first distinct tone over an additional contact in a space adjacent to the first plurality of contacts.

In another example embodiment, an apparatus may include a connector including a first plurality of contacts compatible with an electro-optical transceiver connector. The connector further includes an additional contact at a space adjacent to the first plurality of contacts. The apparatus further includes a tone generator coupled to the additional contact and configured to receive a first signal and to generate a first distinct tone indicative of the first signal for transmission via the additional contact.

In yet another example embodiment, an apparatus may include a means for generating a first distinct tone indicative of a first signal providing one of control or status of an apparatus configured to at least one of transmit or receive a differential data signal over a portion of a first plurality of contacts compatible with an electro-optical transceiver (like an enhanced SFP+) connector. The apparatus may further include a means for transmitting the first distinct tone over an additional contact in a space adjacent to the first plurality of contacts.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein generally relate to multichannel data communication through one or more optical links.

An apparatus and method are provided for two-channel bidirectional communications between devices with shared signaling resources. More specifically, a first transceiver channel is configured to receive first data communications from a first transceiver port. A second transceiver channel is also configured to receive second data communications from a second transceiver port. Signaling (e.g., status and control signals) are configured to utilize a shared resource (e.g., pin) for communicating signaling between a host device and a module device.

Figure 1:
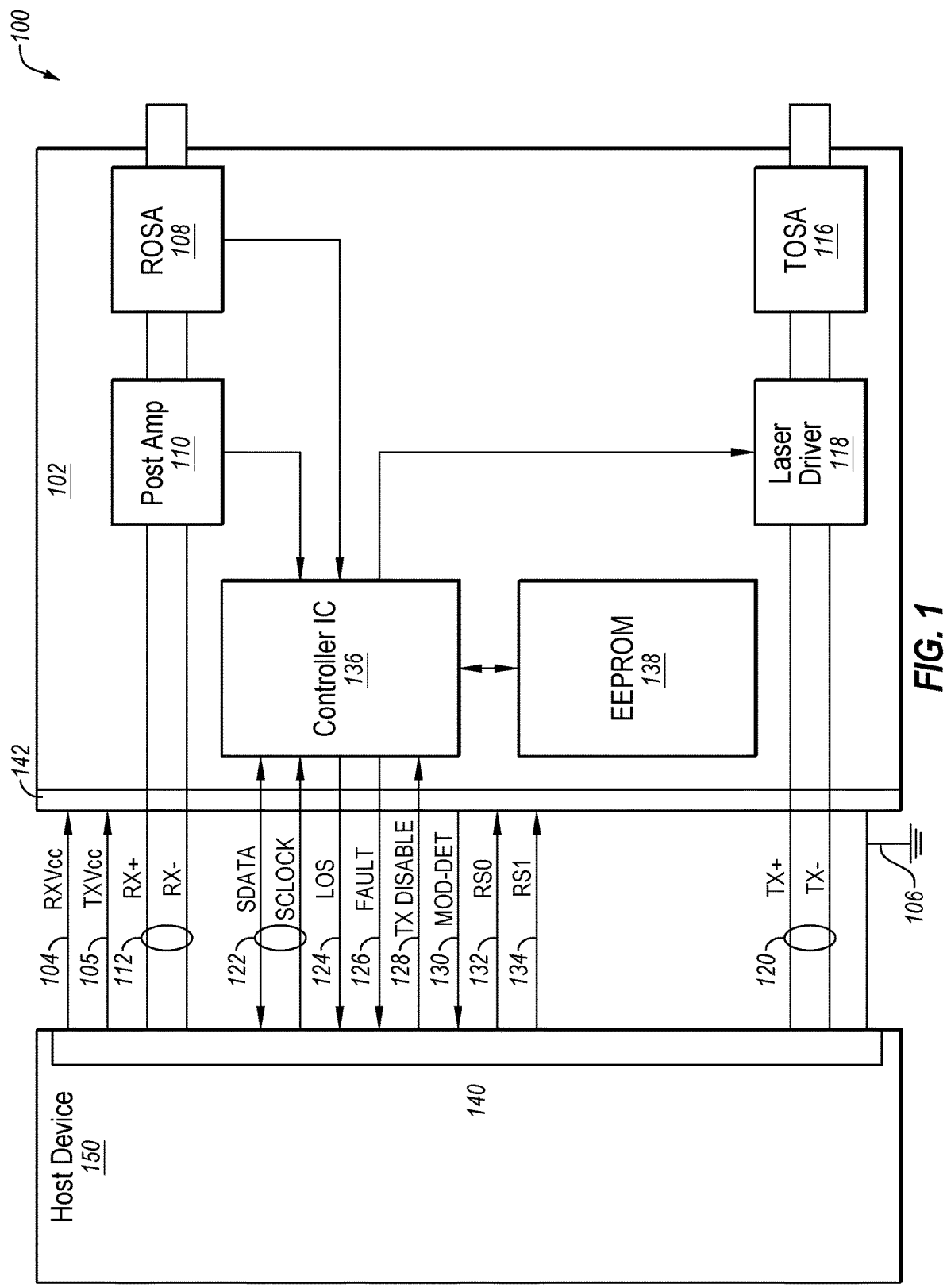
FIG. 1 is a schematic diagram of an enhanced small form factor (SFP+) transceiver module including circuitry and components.

FIG. 1 is a schematic diagram of a transceiver module 100 including circuitry and components. Fiber optic transceiver module 100 may include a circuit board 102 that contains at a minimum a receiver circuit, a transmit circuit, a receiver power connection 104 (RxVcc) and a transmitter power connection 105 (TxVcc), and one or more ground connections 106 (six illustrated).

The receiver circuit may receive relatively small optical signals at an optical detector and may amplify and limit the signals to create a uniform amplitude digital electronic output. The receiver circuit may consist of a Receiver Optical Subassembly ("ROSA") 108, which may include a fiber receptacle as well as a photodiode and preamplifier ("preamp") circuit. ROSA 108 may in turn be connected to a post-amplifier ("postamp") integrated circuit 110, which may generate a fixed output swing digital signal and may be connected to a host device 150 via high-speed receiver data lines 112 (RX+ and RX−).

The transmitter circuit, or laser driver circuit, may accept high-speed digital data and may electrically drive a Light Emitting Diode ("LED"), laser diode, or other optical signal source, to create equivalent optical pulses. The transmit circuit may consist of a Transmitter Optical Subassembly ("TOSA") 116 and a laser driver IC 118. TOSA 116 may include a fiber receptacle as well as an optical signal source such as a laser diode or LED. The laser driver IC 118 may include an alternating current ("AC") driver to provide AC current to the laser diode or LED. The laser driver IC 118 may also include a direct current ("DC") driver to provide bias current to the laser diode or LED. The signal inputs for the AC driver may be obtained via high-speed transmitter data lines 120 (TX+ and TX−).

Transceiver 100 may include various inputs and/or outputs with respect to host device 150, including, for example, a low-speed serial communications path 122—including a serial clock line ("SCLOCK") and a serial data line ("SDATA")—a Loss of Signal ("LOS") indicator 124 to indicate that an optical receive signal is not detected, and/or a fault indicator 126 to indicate a transceiver module's transmitter fault. Further inputs and outputs include a control signal TX_disable 128 allowing the laser driver IC 118 (transmit circuit) to be shut off by the host device 150, a Module Detect (Mod_Det) indicator 130 that is grounded by the transceiver to indicate transceiver module presence. Also, transceiver module input rate select pins includes RS0 signal 132 as an input which optionally selects the operating bandwidth of the receive chain for the transceiver module and RS1 signal 134 as an input which optionally selects operating bandwidth of the transmit chain for the transceiver module 100. Optical transceivers employing these input and/or output connections may include a transceiver controller 136 located either within, or outside, transceiver module 100.

Transceiver module 100 may also include a memory module, such as an Electrically Erasable Programmable Read Only Memory ("EEPROM") 138, to store program and other information readable by transceiver controller 136.

The transceiver module 100 may couple to the host device 150 using a defined interface such as an enhanced small form-factor pluggable (SFP+) interface generally including a host device connector 140 for communicatively connecting the transceiver module 100 to the host device 150. The host connector 140 may be in the form of an edge connector including an arrangement of exposed, conductive surfaces (or "pins"). The pins may be located on two opposite surfaces of a module edge connector 142. The two edge connector surfaces may be described herein as a top side connector and a bottom side connector. Each of the pins of the edge connector 142 may be positioned to form a conductive connection with a corresponding conductive element of the host device connector 140 when the transceiver is connected to (or "plugged into") the host device 150.

Figure 2:
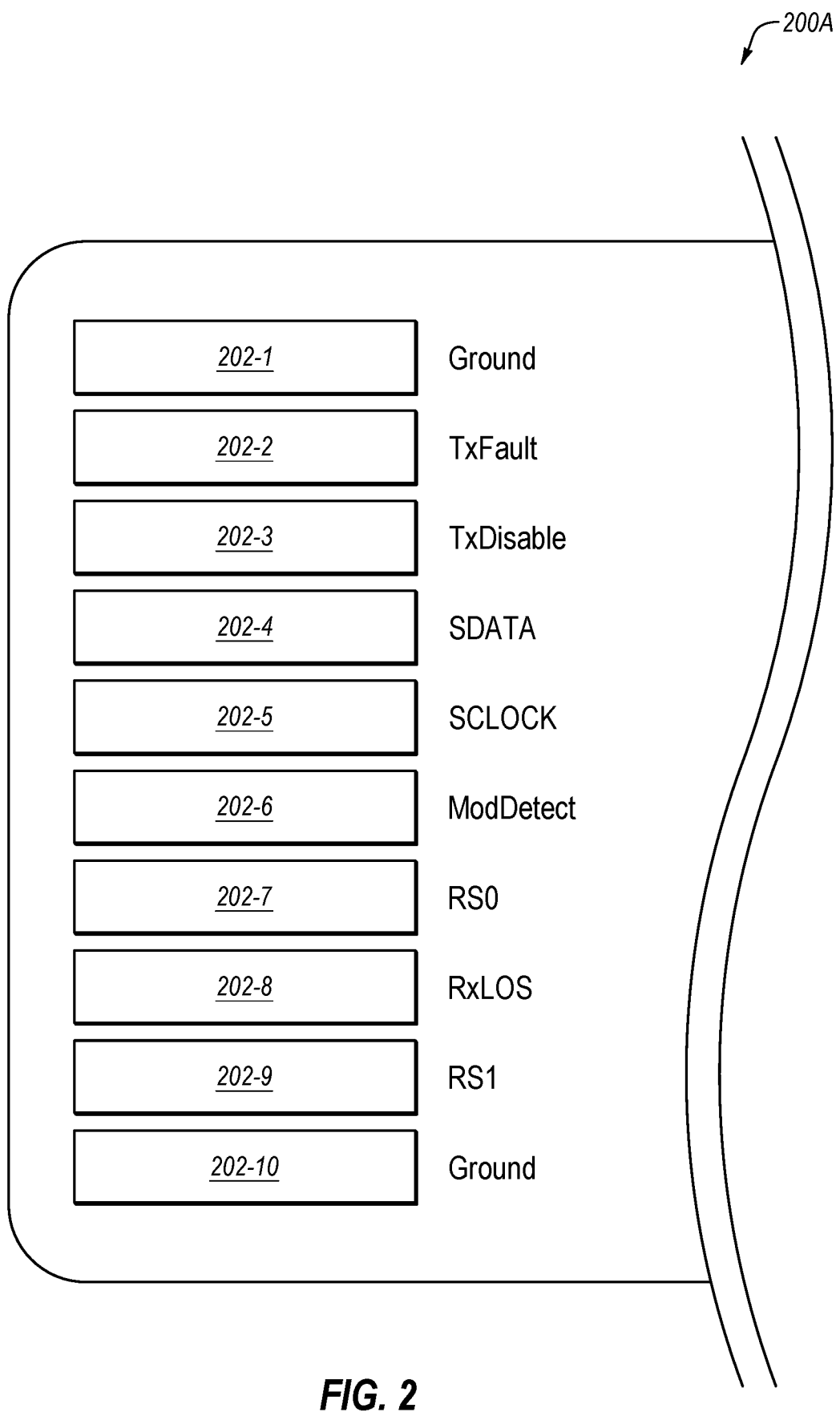
FIG. 2 illustrates a bottom view of an SFP+ interface.

FIG. 2 illustrates a bottom view of an SFP+ interface 200A. Cumulatively, pins 202-2, 202-3, 202-4, 202-5, 202-6, 202-7, 202-8 and 202-9 are considered low-speed control and status pins. Further, pins 202-1 and 202-10 may be connected to a ground of the transceiver module 100 in FIG. 1. The pin 202-2 is a transceiver module 100 output pin and may conduct a signal TX_Fault indicating the transceiver module 100 has detected a fault. The TX_Fault may detect a fault condition related to laser operation or safety. Pin 202-3 is a transceiver module 100 input pin and may conduct a signal TX_Disable indicating to the transceiver module 100 that the transmitter output must be turned off. Pins 202-4 and 202-5 form a two-wire interface clock SCLOCK and data SDATA. Pin 202-6 is a signal detected at the host device that is asserted "high" when the transceiver module is physically absent from the host connector 140 and is pulled "low" when the transceiver module connector 142 is inserted into the host device connector 140. Pins 202-7 and 202-9 respectively correspond with signals RS0 and RS1. The RS0 signal and RS1 signal are input signals to the transceiver module 100 and optionally select the high speed data rate of the receive and transmit chains of the transceiver module 100. RS1 is an input hardware pin which optionally selects the optical transmit path data rate coverage for transceiver module 100. Pin 202-8 is a transceiver module 100 output signal RX_LOS or just LOS which when "high" indicates a received optical signal level that is below a specified threshold.

Figure 3:
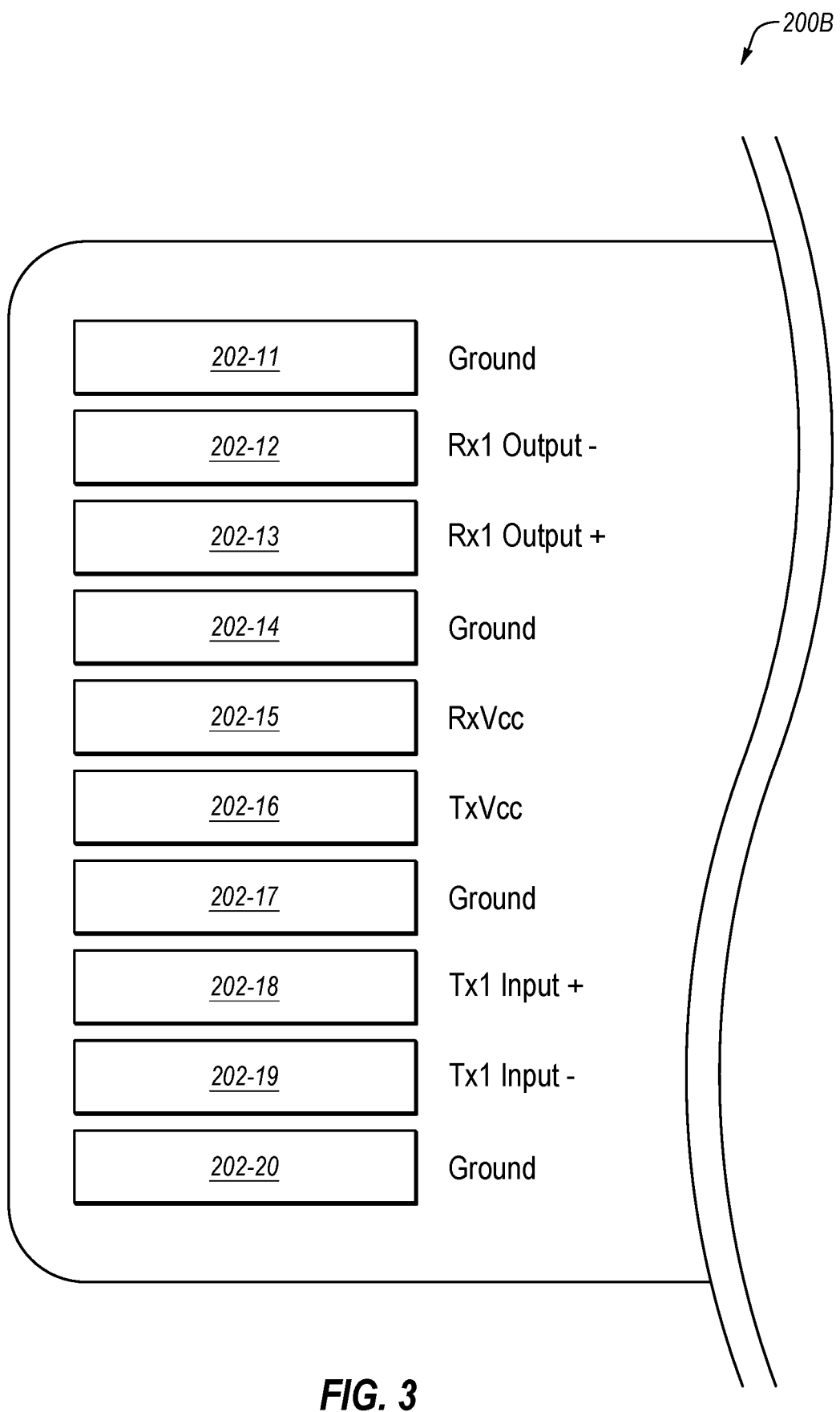
FIG. 3 illustrates a top view of an SFP+ interface.

FIG. 3 illustrates a top view of an SFP+ interface 200B. Specifically, pins 202-11, 202-14, 202-17, and 202-20 may be connected to a ground of the transceiver. Collectively pins 202-1 (FIG. 2), 202-10 (FIG. 2), 202-11, 202-14, 202-17 and 202-20 form the ground connection 106 of FIG. 1. Pins 202-12 and 202-13 may accommodate a high-speed differential output data stream, RX1 Output− and RX1 Output+. Pins 202-15 and 202-16 may respectively provide power to the receiver circuitry RxVcc and power to the transmitter circuitry TxVcc in transceiver module 100. Pins 202-18 and 202-19 may respectively accommodate a high-speed differential input data stream, Tx1 Input+ and Tx1 Input−.

Thus, for example, an SFP+ transceiver module may include only one high-speed w differential data input TX1 Input+/− and only one high-speed differential data output Rx1 Output+/−, both located on the top side connector as illustrated in FIG. 3. The bottom side connector of an SFP+ transceiver module may not be configured to input or output high-speed signals. As a result, signal integrity of high-speed signals communicated via the bottom side connector of SFP+ transceivers may be compromised.

Some embodiments described herein may double the data flow into and out of a transceiver relative to a single transmitter and single receiver SFP+ transceiver. Alternately or additionally, embodiments may double the data flow into and out of the transceiver within a footprint associated with the SFP+ form factor without relying on an increase in the signaling speed of the data stream. Some embodiments may be used with 50-Gbps (50 G) or 100-Gbps (100 G) optical transceivers having a form factor similar to SFP+.

Thus, for example, a 50-Gbps transceiver having an SFP+ form factor for use with a host device having electrical interface signaling rates limited to 25 Gbps may be possible. Similarly, a 100-Gbps transceiver having an SFP+ form factor for use with a host device having electrical interface signaling rates limited to 50 Gbps may be possible.

Figure 4A:
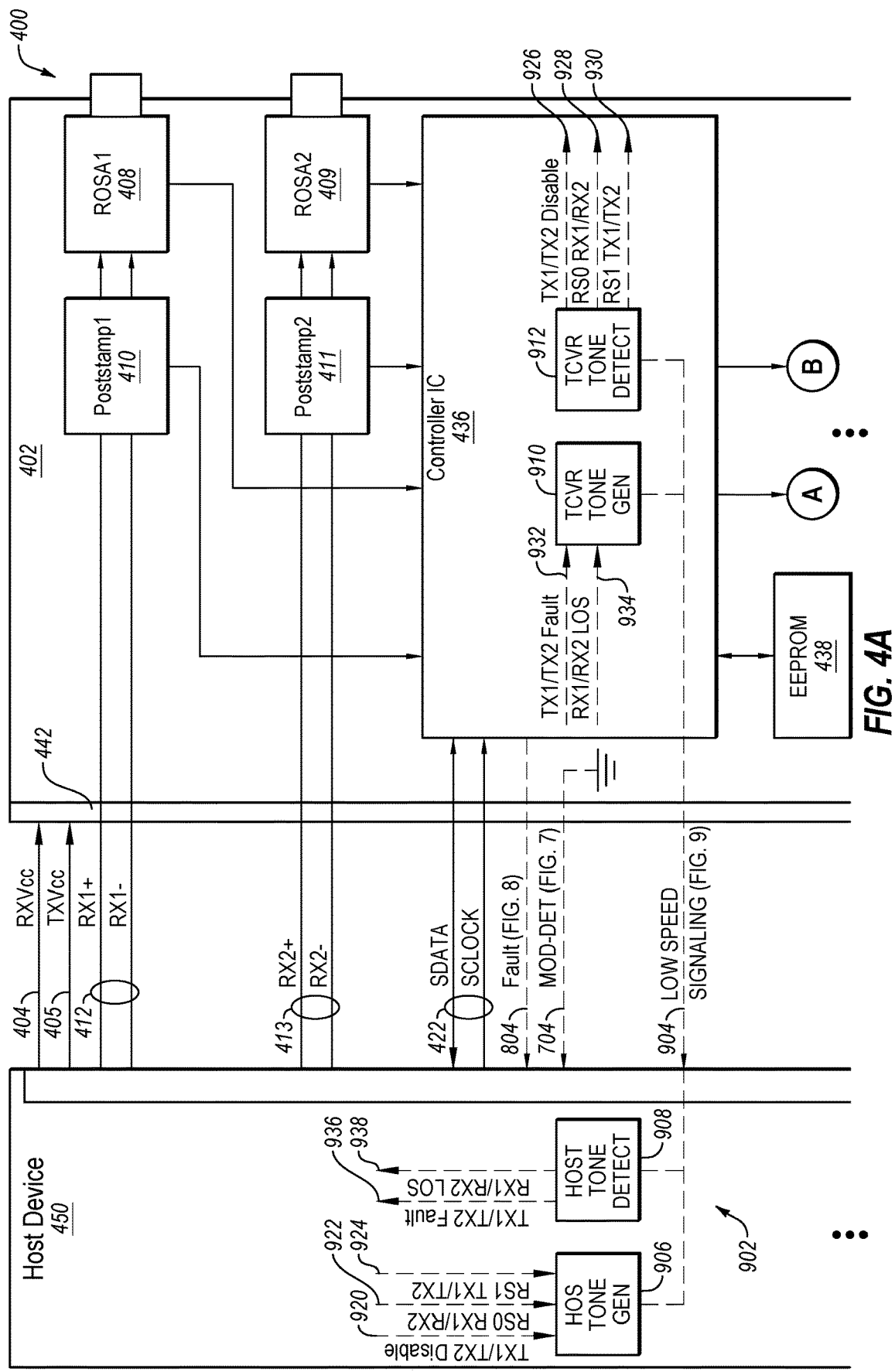
FIG. 4A and FIG. 4B is a schematic diagram of a transceiver module including a plurality of transmitter channels and a plurality of receiver channels.
Figure 4B:
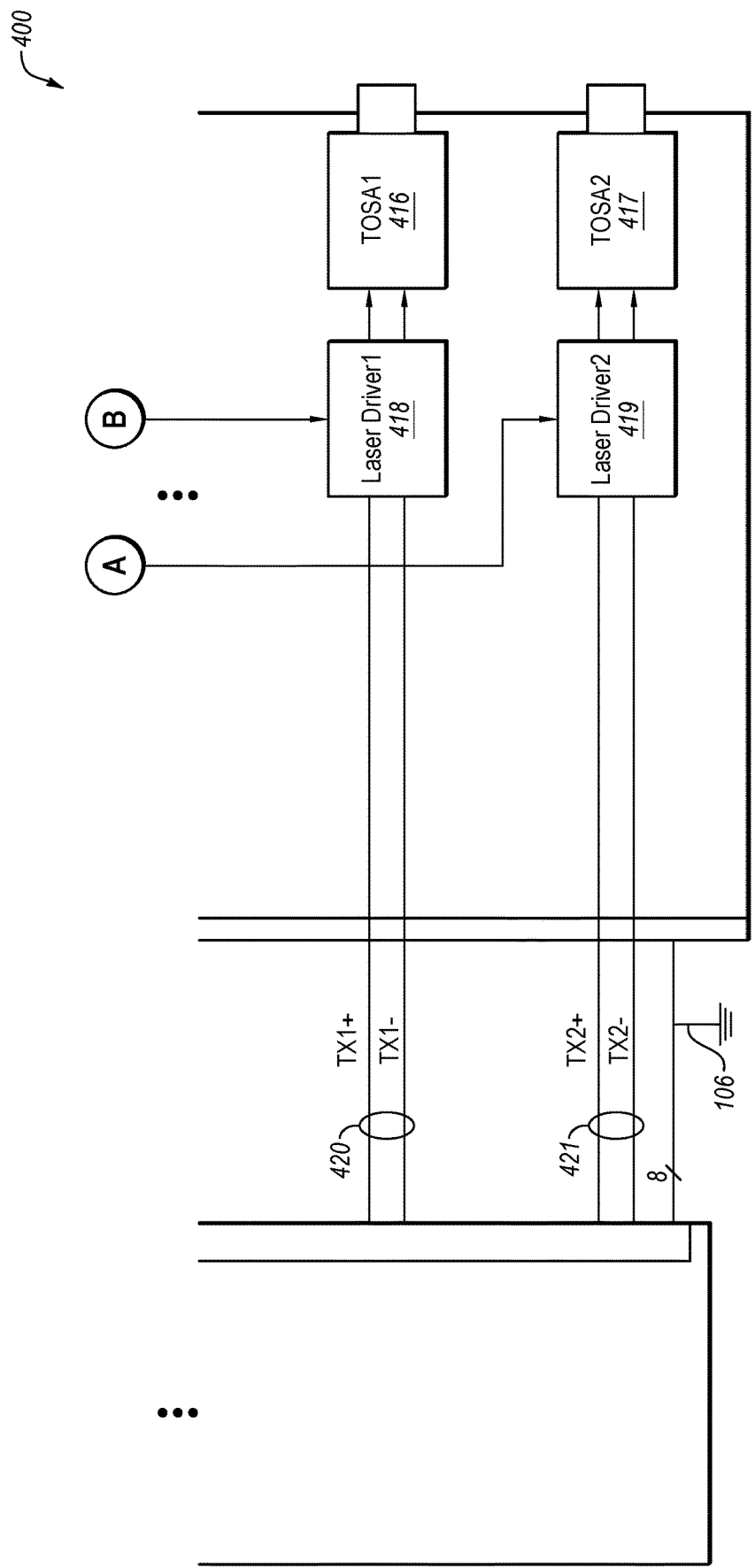

FIG. 4A and FIG. 4B is a schematic diagram of a transceiver module 400 including a plurality of transmitter channels and a plurality of receiver channels. In some embodiments, the transceiver may include two high-speed differential input data streams and two high-speed differential output data streams. Grounding structures may be included around both high-speed differential input data streams and both high-speed differential output data streams. The grounding structures included around each of the high-speed differential data streams may accommodate relatively high signal integrities.

For example, the bottom side connector of the transceiver may eliminate pins of an SFP+ transceiver associated with low-speed control (e.g., the TxDisable pin, the RS0Rx pin, and the RS1Tx pin) and status (e.g., the TxFault pin, the ModDetect pin, and the RxLOS pin). In some embodiments, all control and status may be performed through the 2-wire interface SDATA and SCLOCK function for communication with a transceiver controller. Alternately or additionally, data stream squelch methods may be employed to convey control and status data, such as TxDisable- and RxLOS-type information.

The bottom side connector may add support for receiver and transmitter differential data pairs. Thus, compared with an SFP+ connector implementing all low-speed signals on dedicated pins, the modified SFP+ connector may double high-speed data capacity of an associated transceiver. Furthermore, the modified SFP+ connector and the associated transceiver may be compatible with host connectors with an SFP+ connector style. The host connector may be configured to maintain signal integrity for high-speed signals at the bottom side of the connector.

In FIG. 4A and FIG. 4B, a transceiver module 400 may include a circuit board 402 that contains at a minimum two receiver circuits, two transmit circuits, a receiver power connection 404 (RxVcc) and a transmitter power connection 405 (TxVcc), and one or more ground connections 406 (eight connections illustrated).

The receiver circuits may receive relatively small optical signals at respective optical detectors and may amplify and limit the signals to create uniform amplitude digital electronic outputs. The receiver circuits may consist of Receiver Optical Subassemblies ("ROSAs") 408 and 409, which may include fiber receptacles as well as photodiodes and preamplifier ("preamp") circuits. ROSAs 408 and 409 may in turn be connected to a post-amplifier ("postamp") integrated circuits 410 and 411, which may generate fixed output swing digital signals and may be connected to a host device 450 via first high-speed receiver data lines 412 (RX1+, RX1−) and second high-speed receiver data lines 413 (RX2+, RX2−).

The transmitter circuits, or laser driver circuits, may accept high-speed digital data and may electrically drive Light Emitting Diodes ("LEDs"), laser diodes, or other optical signal sources, to create equivalent optical pulses. The transmit circuit may consist of a Transmitter Optical Subassemblies ("TOSAs") 416 and 417, and laser driver ICs 418 and 419. TOSAs 416 and 417 may each include a fiber receptacle as well as an optical signal source such as a laser diode or LED. The laser driver ICs 418 and 419 may each include an alternating current ("AC") driver to provide AC current to the laser diode or LED. The laser driver ICs 418 and 419 may also each include a direct current ("DC") driver to provide bias current to the laser diode or LED. The signal inputs for the AC driver may be obtained via first high-speed transmitter data lines 420 (TX1+ and TX1−) and second high-speed transmitter data lines 421 (TX1+ and TX2−).

Transceiver module 400 may include various inputs and/or outputs with respect to host device 450, including, for example, a low-speed serial communications path 422—including a serial clock line ("SCLOCK") and a serial data line ("SDATA"). Because more of the pins in the 20-pin connector have been dedicated to a second transmit channel and a second receiver channel, various control and status signals need to be communicated between the transceiver module 400 and host device 450 using a mechanism other than having individually dedicated pins. In the present embodiment, the low-speed serial communications path 422 may be used to communicate various control signals and status between the w transceiver module 400 and the host device 450. Specifically, a Loss of Signal ("LOS") indicator indicating that one or both of the receive signals are not detected, and a fault indicator (TxFault1/2) indicating that one or both of the transceiver modules are running too hot may be communicated over the low-speed serial communications path 422. Also, inputs and outputs, including control signal TX1_disable and TX2_disable allowing the transmit circuits to be shut off by the host device 450, a Module Detect (Mod_Det) indicator to indicate transceiver module presence, may also be communicated over the low-speed serial communications path 422. Furthermore, transceiver module input rate select pins includes RS0RX1 signal and RS0RX2 signal which optionally select the optical receive data path rates for the transceiver module 400. Also, RS1TX1 signal and RS1TX2 signal which optionally select the optical transmit path data rates for the transceiver module 400 may also be communicated over the low-speed serial communications path 422.

Transceiver module 400 may also include a memory module, such as an Electrically Erasable Programmable Read Only Memory ("EEPROM") 438, to store program and other information readable by transceiver controller 136.

The transceiver module 400 may couple to the host device 450 using a modified interface such as a modified enhanced small form-factor pluggable (SFP+) interface generally including a host device connector 440 for communicatively connecting the transceiver module 400 to the host device 450. The host connector 440 may be in the form of an edge connector including an arrangement of exposed, conductive surfaces (or "pins"). The pins may be located on two opposite surfaces of a module edge connector 442. The two edge connector surfaces may be described herein as a top side connector and a bottom side connector. Each of the pins of the edge connector 442 may be positioned to form a conductive connection with a corresponding conductive element of the host device connector 440 when the transceiver is connected to (or "plugged into") the host device 450.

Figure 5:
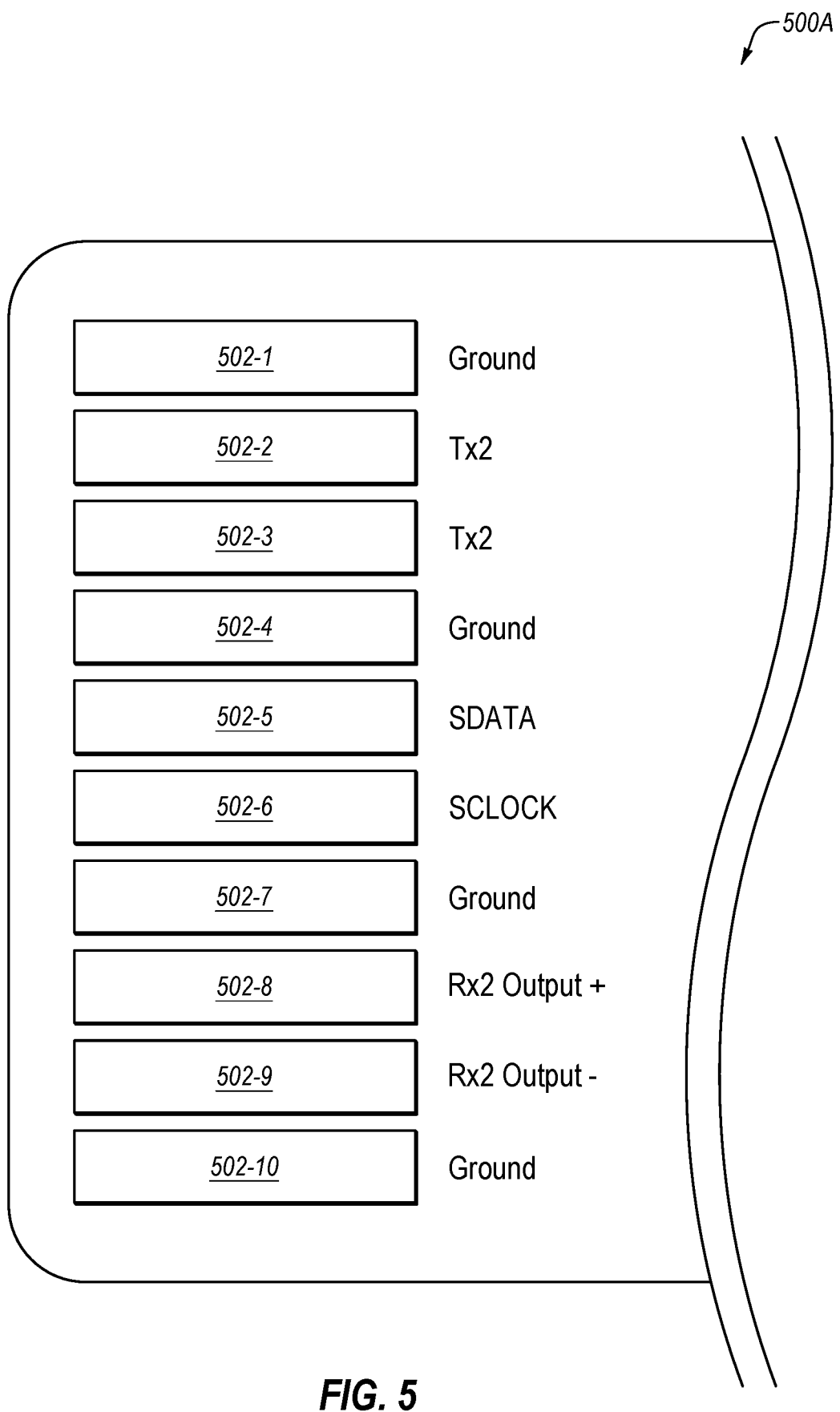
FIG. 5 illustrates a bottom view of a modified SFP+ interface.

FIG. 5 illustrates a bottom view of a modified SFP+ interface 500A. FIG. 5 illustrates a bottom view of a modified SFP+ interface 500A. In FIG. 5, various low-speed signals have been combined to make available additional differential "lanes" or paths for high-speed signal paths. While FIG. 5 and FIG. 6 illustrate the addition of a single additional high-speed differential transmit lane or path and a single additional high-speed differential receive lane or path, even further additional lanes may be created by yet further combining yet additional low-speed signals with other existing low-speed signals.

Additionally, while the present disclosure illustrates the disclosed combining of low-speed signals to make available high-speed data paths in an enhanced SFP+ form factor, other connectors and implementations are also contemplated to be within the scope of the disclosure.

Pins 502-2 and 502-3 may respectively accommodate a high-speed differential input data stream, Tx2 Input- and Tx2 Input+. Pins 502-8 and 502-9 may accommodate a high-speed differential output data stream, RX2 Output+ and RX2 Output-. Pins 502-5 and 502-6 are considered low-speed pins. Specifically, pins 502-5 and 502-6 form a two-wire interface clock SCLOCK and data SDATA and communicate, among other things, various control signals and status between the transceiver module 400 and the host device 450. Specifically, a Loss of Signal ("LOS") indicator, fault indicators (Tx1Fault and Tx2Fault), control signal TX1_disable and TX2_disable, RS1TX1 signal and RS1TX2 signal, and a Module Detect (Mod_Det) indicator to indicate transceiver module presence, transceiver module input rate select pins includes RS0RX1 signal and RS0RX2 signal over the low-speed serial communications path 422. Further, pins 502-1, 502-4, 502-7 and 502-10 may be connected to a ground of the transceiver module 400 in FIG. 4A and FIG. 4B.

Figure 6:
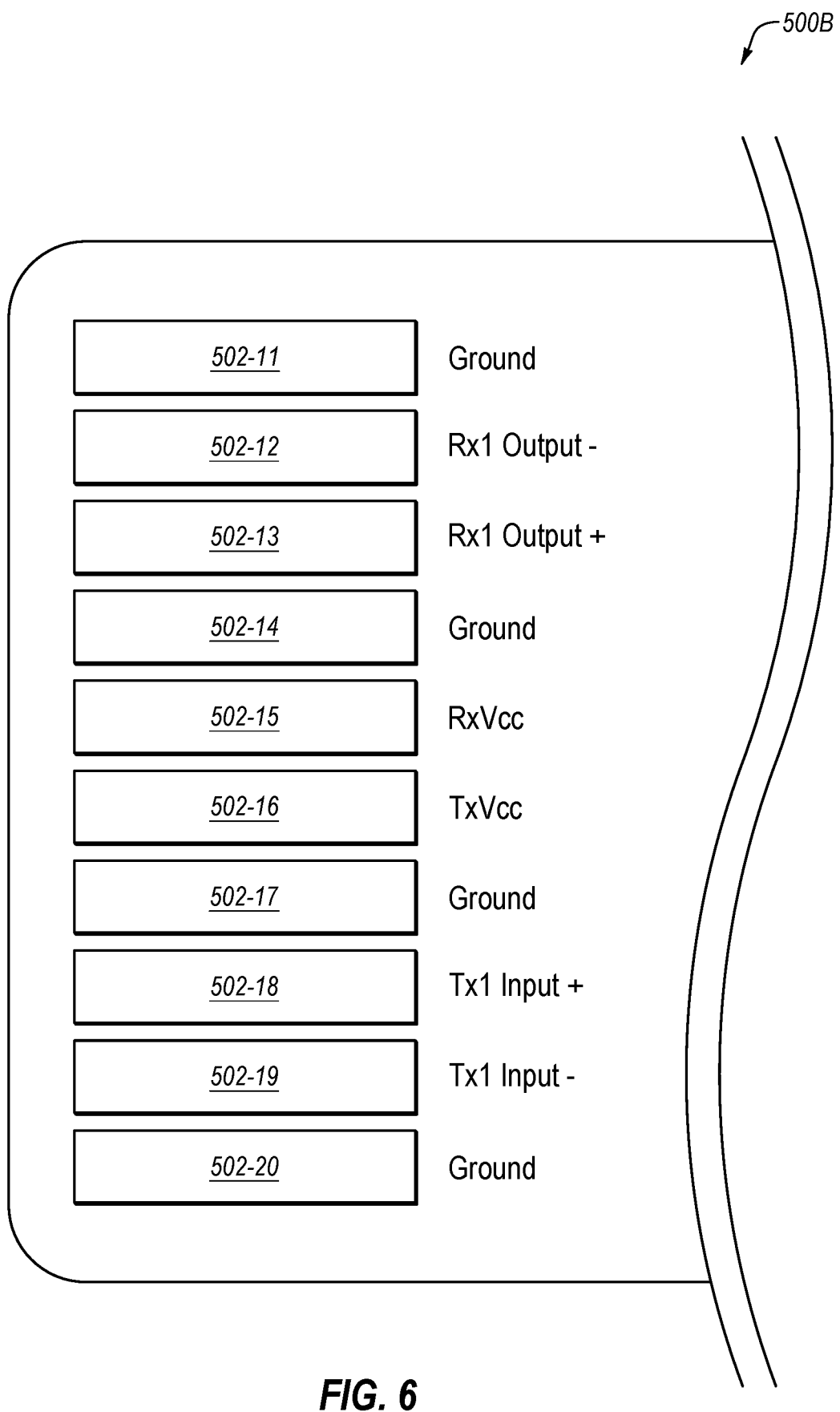
FIG. 6 illustrates a top view of a modified SFP+ interface.

FIG. 6 illustrates a top view of a modified SFP+ interface 500B. Specifically, pins 502-11, 502-14, 502-17, and 502-20 may be connected to a ground of the transceiver. Collectively pins 502-1 (FIG. 5), 502-4 (FIG. 5), 502-7 (FIG. 5), 502-10 (FIG. 5), 502-11, 502-14, 502-17 and 502-20 form the ground connection 406 of FIG. 4A and FIG. 4B. Pins 502-12 and 502-13 may accommodate a high-speed differential output data stream, RX1 Output- and RX1 Output+. Pins 502-15 and 502-16 may respectively provide power to the receiver circuitry RxVcc and power to the transmitter circuitry TxVcc in transceiver module 400. Pins 202-18 and 202-19 may respectively accommodate a high-speed differential input data stream, Tx1 Input+ and Tx1 Input−.

Figure 7:
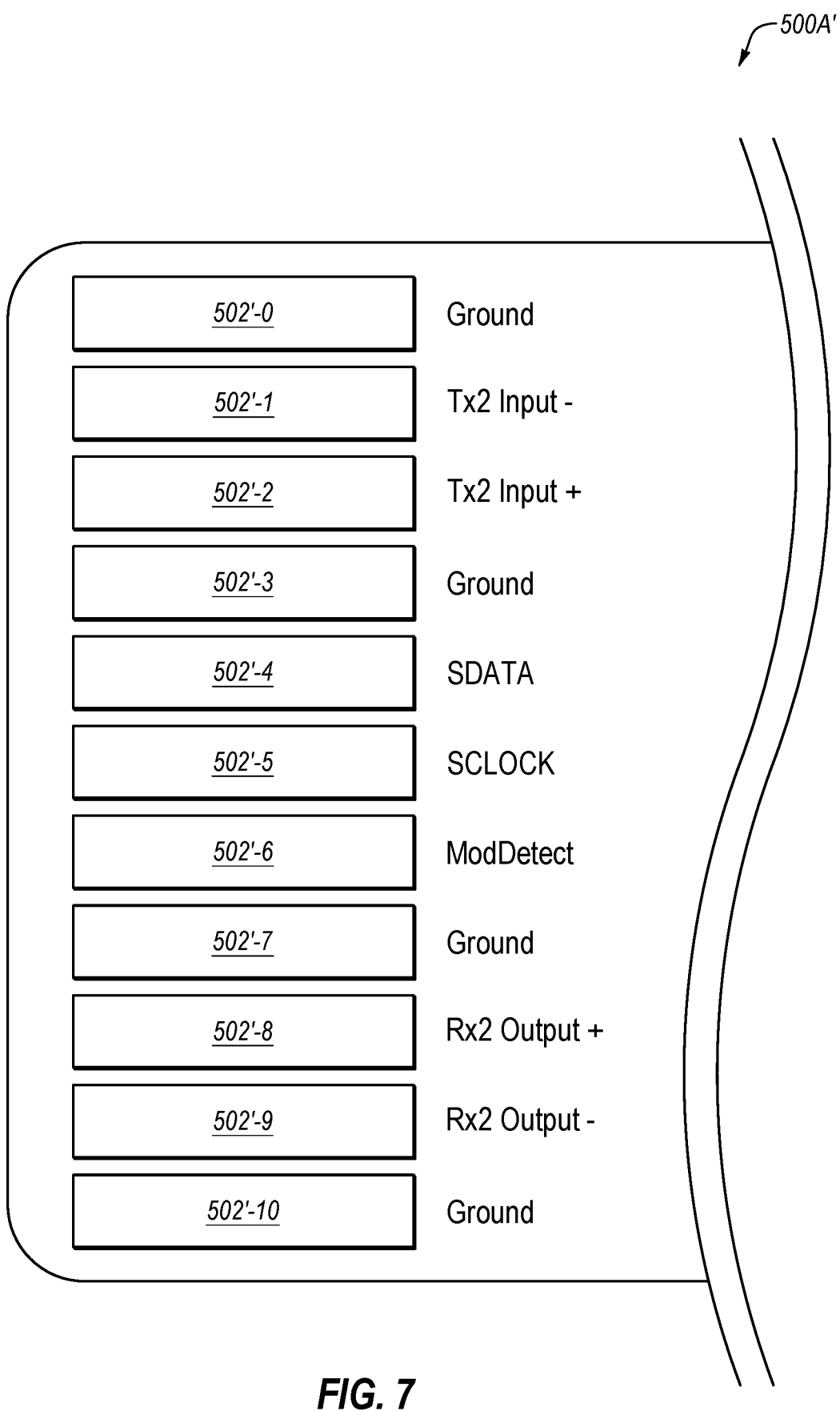
FIG. 7 illustrates an alternative bottom view of a modified SFP+ interface.

FIG. 7 illustrates an alternative bottom view of a modified SFP+ interface 500A' of FIG. 5. In the present embodiment, rather than relying on the eliminated ModDetect pin in the embodiment of FIG. 5, the host device 450 may employ alternate methods of determining when a transceiver module 400 has been coupled via an SFP+ connector using an additional contact or pin. The additional contact or pin is generally placed in a space on the connector or card edge that does not affect the compatibility of the plurality of contacts or pins that are compatible with an SFP+ connector. The signals may them be relocated along the SFP+ connector and the additional contact or pin. The additional signal in the present embodiment is illustrated as Mod_Det 704 in FIG. 4A and FIG. 4B. Alternately or additionally, a host device 450 may be configured to attempt to communicate via the two-wire interface clock SCLOCK and data SDATA to identify whether the inserted transceiver module has a conventional SFP+ connector or the modified connector described herein.

In the embodiment of FIG. 7, an additional pin 502'-0 is formed and the other respective signals are adjusted to other pins as shown. For example, the bottom side connector may introduce an 11th pin, shown as 502'-0. Conventional SPF+ pin locations are intentionally offset from the centerline, which results in a relatively larger space between the first pin 502'-1 and the edge of the circuit board. Thus, for example, the zero pin 502'-0 may be included in this relatively large space. In some embodiments, the zero pin 502'-0 may be narrower than the other pins to maintain a typical gap between the zero pin 502'-0 and the circuit board edge. Alternately, the zero pin 502'-0 may have a standard width and the gap between the zero pin 502'-0 and the circuit board edge may be relatively narrower.

Thus, for example, the bottom side connector of the transceiver may eliminate pins of the conventional SFP+ transceiver associated with low-speed control (e.g., the TxDisable pin, the RS0Rx pin, and the RS1Tx pin) and status (e.g., the TxFault pin and the RxLOS pin). In some embodiments, all control and status functions, except for the functions performed by the ModDetect, may be performed through the two-wire interface clock SCLOCK and data SDATA. For example, the ModDetect functions for enabling a host device to detect the transceiver module may be performed via pin 502'-6. Additionally, the SDATA and SCLOCK functions for communication with a transceiver controller may be performed via pins 502'-4 and 502'-5. Alternately or additionally, data stream squelch methods may be employed to convey control and status data, such as TxDisable- and RxLOS-type information.

Thus, for example, the SDATA, SCLOCK, and ModDetect may be located in the same positions as on the standard SFP+ connector. A host device may be configured to detect insertion of a transceiver having the above-described connector and/or a standard SFP+ transceiver by communicating with the same set of pins. After establishing communication with the installed transceiver and determining the type inserted, the host device may then activate the appropriate high-speed or low-speed interface for controlling the specific type of inserted transceiver module. The bottom side connector may add support for receiver and transmitter differential data pairs. Thus, compared with a conventional SFP+ connector, the connector may double high-speed data capacity of an associated transceiver. The host connector may be configured to maintain signal integrity for high-speed signals at the bottom side of the connector.

Figure 8:
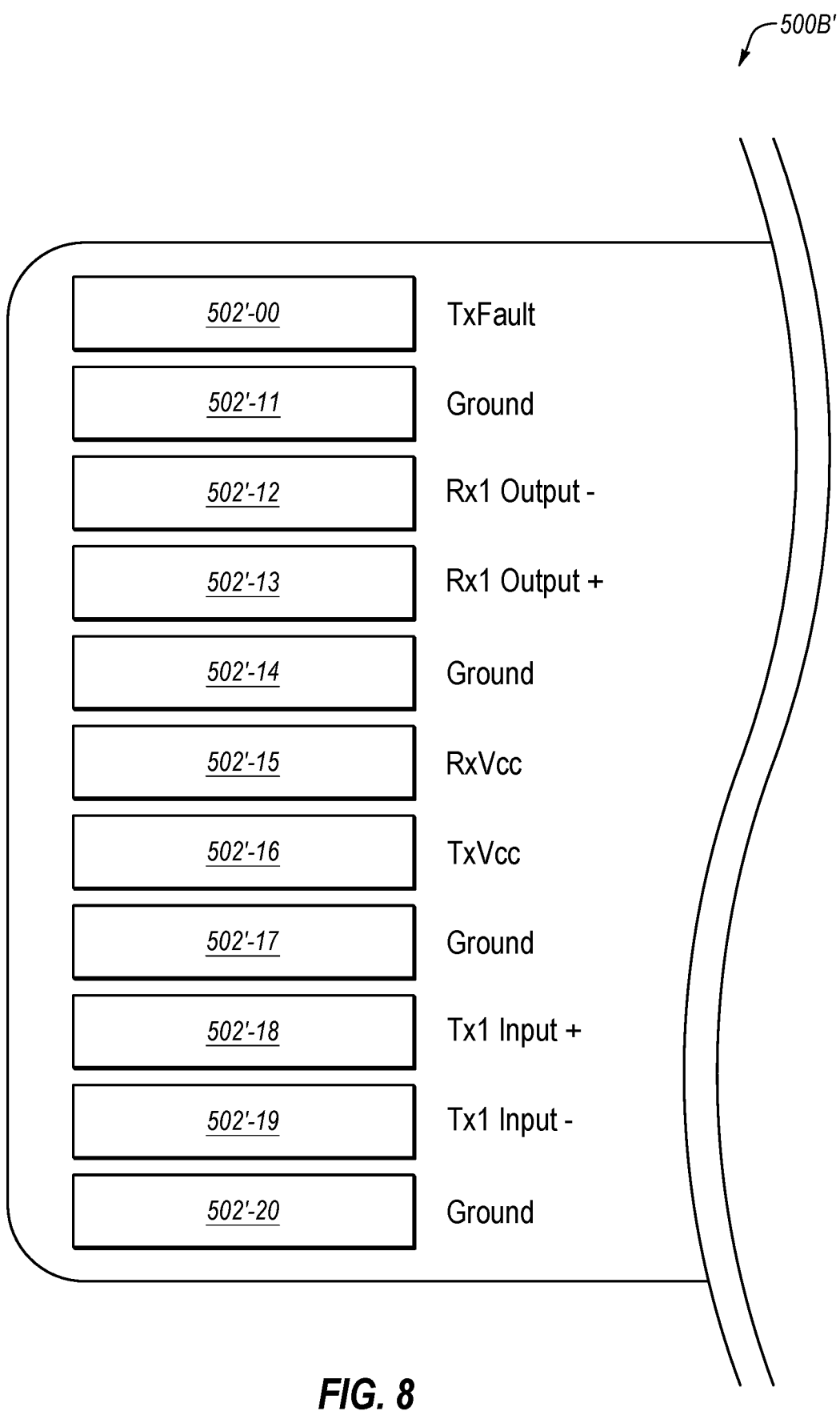
FIG. 8 illustrates and alternative top side view of a modified SFP+ interface.

FIG. 8 illustrates and alternative top side view of a modified SFP+ interface 500B' of FIG. 6. In some embodiments, an eleventh pin 502'-00 may be introduced to the top side connector in a manner similar to the above-described bottom side connector of FIG. 7 having an eleventh pin. Pins 502'-11, 502'-14, 502'-17 and 502'-20 may be connected to a ground signal of the transceiver device 400. Pins 502'-12 and 502'-13 may accommodate a high-speed differential output data stream Rx1Output− and Rx1Output+. Pins 502'-15 and 502'-16 may provide power for the receiver circuitry RxVcc and power to the transmitter circuitry TxVcc, respectively. Pins 502'-18 and 502'-19 may accommodate a high-speed differential input data stream Tx1 Input+ and Tx1

Input-. The eleventh pin, 502'-00 may provide a low-speed TxFault signal 804 (FIG. 4A and FIG. 4B) for signaling to the host device there is a fault in the transceiver module. Alternately, the eleventh pin 502'-00 may provide a different low-speed interface. For example, the eleventh pin 502'-00 may provide a low-speed control or status interface that is not included on a counterpart bottom side connector, but that is included on a conventional SFP+ bottom side connector.

The host device may be configured to include a 21-pin or 22-pin host device connector for facilitating a connection with the additional pin or pins of the transceiver module. The host device connector may be configured for relatively high precision alignment with the transceiver module connector, particularly if the zero pin 502'-0 and/or the eleventh pin 502'-00 are relatively narrower than conventional width pins.

Figure 9:
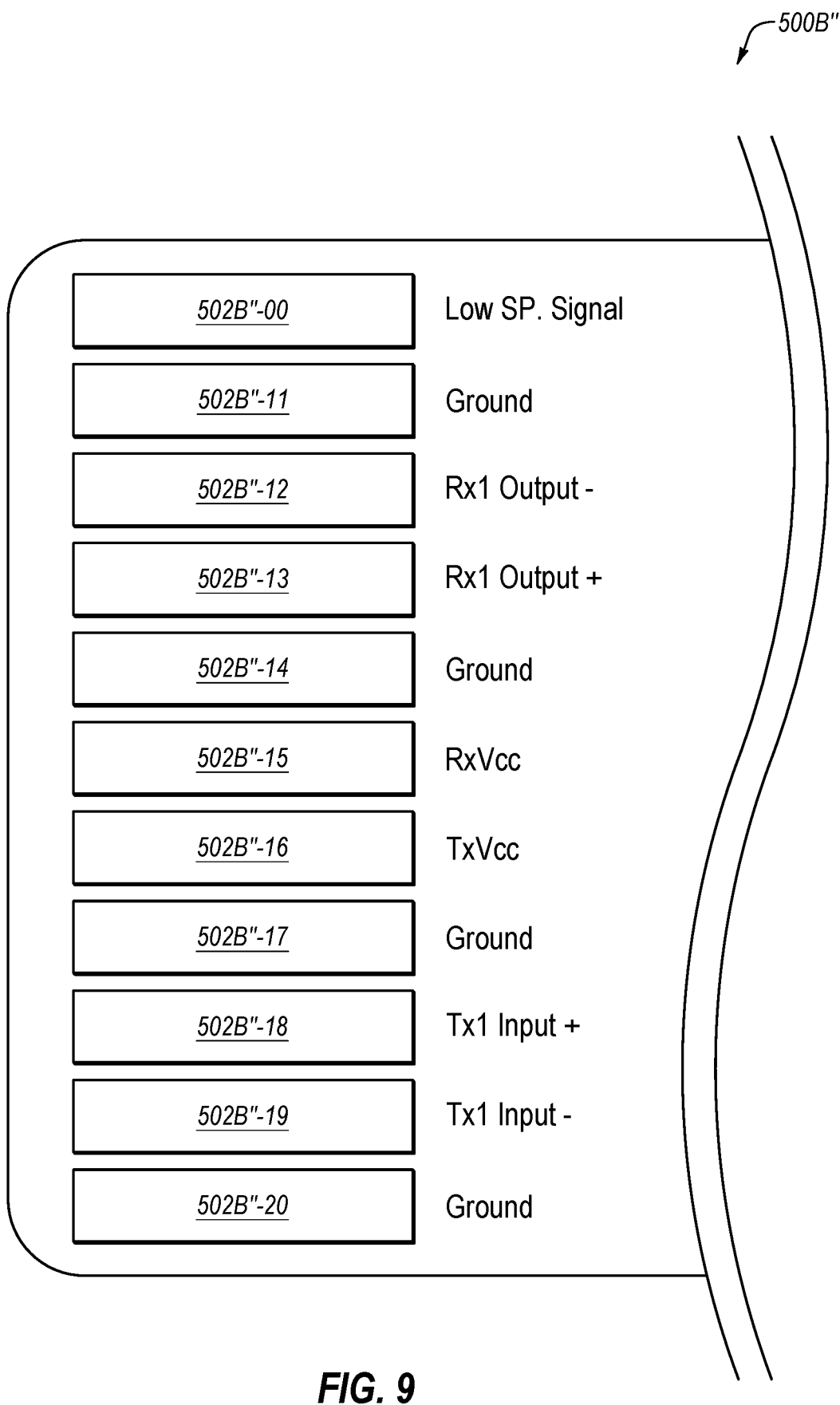
FIG. 9 illustrates and alternative top side view of a modified SFP+ interface.

FIG. 9 illustrates and alternative top side view of a modified SFP+ interface 500B" of FIG. 6. In some embodiments, an eleventh pin 502"-00 may be introduced to the top side connector in a manner described above with respect to FIG. 8. The eleventh pin 502"-00 may be configured as a low-speed signal for signaling status and control signals previously described with respect to FIGS. 4-6 as being communicated over the two-wire interface generated by the clock SCLOCK and data SDATA. The top side view of modified SFP+ interface 500B" may be compatible with bottom side views 500A of FIGS. 5 and 500A' of FIG. 7. All or some of the various control signals and status between the transceiver module 400 and the host device 450 may be communicated over the low-speed signal 502B"-00. Specifically, a Loss of Signal ("LOS") indicator, fault indicators (Tx1Fault and Tx2Fault), control signal TX1_disable and TX2_disable, RS1TX1 signal and RS1TX2 signal, and a Module Detect (Mod_Det) indicator to indicate transceiver module presence, transceiver module input rate select pins includes RS0RX1 signal and RS0RX2 signal may be signaled via low-speed signal pin 502B"-00 over the low-speed signaling channel 902 including the low-speed signaling path 904 of FIG. 4A and FIG. 4B.

The embodiment of FIG. 9 and the low-speed signaling of FIG. 4A and FIG. 4B allows the pins that were previously used for low-speed signaling to be otherwise used to provide multiple differential transmit input signals and multiple differential receiver output signals, as described above with respect to FIG. 4A and FIG. 4B. As stated above, combining low-speed signals on share signal paths frees-up connector pins and signal paths that can then be used to exchange high-speed data through the creation of additional high-speed differential transmit and/or receive signal lanes or paths.

For example, low-speed signals such as Tx_Fault, Rx_LOS, Tx_Disable and RS0/1, may be communicated over a single low-speed signaling path 904. The embodiment of FIG. 9 and the low-speed signaling of FIG. 4A and FIG. 4B assigns precise electrical low-speed frequencies (referred hereinafter as "tone") to low-speed functions like Tx_Fault, Rx_LOS, Tx_Disable and RS0/1, in order to convey them via fewer pins than otherwise required. Multi tones can be generated and decoded between the transceiver module 400 and the host device 450 over a low-speed signaling path 904 using a low-speed signal pin 502B"-00. The use of "tones" for low-speed signaling also provides a performance advantage over multiplexed or protocol signaling over a two-wire interface, such as the SDATA and SCLK interface. While the disclosure of "tone" signaling is described herein with respect to an enhanced SFP+ form factor, other connectors and implementations are also contemplated to be within the scope of the disclosure.

With reference to FIG. 4A and FIG. 4B, the low-speed signaling channel 902 includes a host tone generator 906, host tone detector 908, low-speed signaling path 904, transceiver tone generator 910 and transceiver tone detector 912. The host device 450 may include a tone generator 906.

The host tone generator 906 may receive one or more control signals TX1/TX2 Disable 920, RS0RX1/RX2 Receive Data Rate 922, and RS1TX1/TX2 Transmit Data Rate 924. The host tone generator 906 generates a distinct tone for each of the activated one or more control signals. Any generated distinct tones are transmitted from the host device 450 and along the low-speed signaling path 904 to the transceiver module 400. The transceiver tone detector 912 at the transceiver module 400 receives from the low-speed signaling path 904 the distinct tones for each of the activated one or more control signals. The transceiver tone detector 912 then generates the respective control signals TX1/TX2 Disable 926, RS0RX1/RX2 Receive Data Rate 928, and RS1TX1/TX2 Transmit Data Rate 930 based on the received and detected distinct tone.

Similarly, the transceiver tone generator 910 may receive one or more control signals TX1/TX2 Fault 932, and RX1/RX2 LOS 934. The transceiver tone generator 910 generates a distinct tone for each of the activated one or more control signals. Any generated distinct tones are transmitted from the transceiver module 400 and along the low-speed signaling path 904 to the host device 450. The host tone detector 908 at the host device 450 receives from the low-speed signaling path 904 the distinct tones for each of the activated one or more control signals. The host tone detector 908 then generates the respective control signals based on the received and detected distinct tone.

Assigning distinct electrical low-speed frequencies ("tones") to low speed functions like Tx_Fault, Rx_LOS, Tx_Disable and RS0/1 allows other pins to be available for data exchange. By defining a bi-directional multi-tone communication between the host device and the transceiver module, these tones can be used as input to or output from the transceiver module using a common or shared pin.

Figure 10:
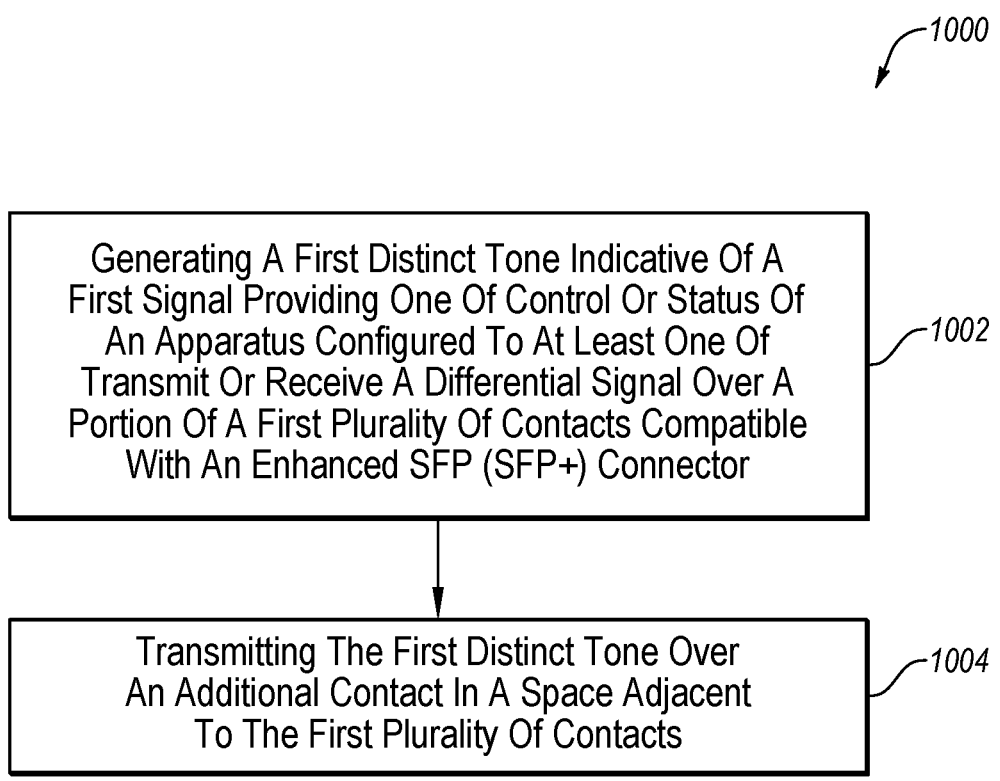
FIG. 10 show an example flow diagram of a method 1000 of signaling and transmitting data using an additional pin that his shared for various control and status signals.

FIG. 10 show an example flow diagram of a method 1000 of signaling and transmitting data using an additional pin that his shared for various control and status signals. The method 1000 may be performed in whole or in part by a host device 450 of FIG. 4A and FIG. 4B or by a transceiver module 400 also of FIG. 4A and FIG. 4B. Furthermore, the method may be performed cooperatively between both the host device 450 and the transceiver module 400. Although illustrated as discrete blocks, various blocks may be divided into additional blocks, combined into fewer blocks, or eliminated, depending on the desired implementation.

Referring to FIG. 10, the method 1000 may begin at block 1002 in which an apparatus such as a host device or transceiver module generate a first distinct tone indicative of a first signal. The first signal provides one of control or status of the apparatus is configured to at least transmit or receive a differential signal over a portion of a first plurality of contacts. The plurality of contacts are compatible with an enhanced SFP (SFP+) connector.

At block 1004, the apparatus transmits the first distinct tone over an additional contact in a space adjacent to the first plurality of contacts. The additional contact is in addition to the plurality of contacts that are compatible with the SFP+ connector.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    an enhanced connector including a first plurality of contacts that correspond with all contacts of a standard type of electro-optical transceiver connector, the enhanced connector further comprising an additional contact at a space adjacent to the first plurality of contacts;
    a tone generator coupled to the additional contact, the tone generator configured to receive a first signal indicative of a signal exchanged over the standard type of electro-optical transceiver connector and configured to generate a first distinct tone, indicative of the first signal, for transmission via the additional contact,
    wherein the tone generator is further configured to receive a second signal and to generate a second distinct tone, indicative of the second signal, for transmission via the additional contact, and
    wherein the first and second distinct tones are concurrently transmitted via the additional contact.

2. The apparatus to claim 1, further comprising a tone detector configured to detect a distinct tone received via the additional contact and generate a signal indicative of the distinct tone.

3. The apparatus of claim 1, wherein at least a portion of the first plurality of contacts couple to first differential receiver outputs and second differential receiver outputs.

4. The apparatus of claim 1, wherein at least a portion of the first plurality of contacts couple to first differential transmitter inputs and second differential transmitter inputs.

5. The apparatus of claim 1, wherein at least a portion of the first plurality of contacts couple to first differential receiver outputs, second differential receiver outputs, first differential transmitter inputs, and second differential transmitter inputs.

6. The apparatus of claim 1, wherein the first signal is a control signal indicative of transmitter disable, receiver data rate selector, or transmitter data rate selector.

7. The apparatus of claim 1, wherein the first signal is a status signal indicative of transmitter fault or receiver loss of signal (LOS).

8. The apparatus of claim 1, wherein the first plurality of contacts and the additional contact are formed in a transceiver module or a host device.

9. A method comprising:
    generating a first distinct tone indicative of a first signal indicative of a signal exchanged over a standard type of electro-optical transceiver connector, the first signal providing control or status of an apparatus configured to transmit or receive a differential data signal over a portion of a first plurality of contacts corresponding with all contacts of the standard type of electro-optical transceiver connector;
    transmitting the first distinct tone and a second distinct tone, indicative of a second signal, over an additional contact in a space adjacent to the first plurality of contacts by concurrently transmitting the first and second distinct tones via the additional contact.

10. The method of claim 9, further comprising:
    detecting a distinct tone received via the additional contact; and
    generating a signal indicative of the distinct tone.

11. The method of claim 9, wherein at least a portion of the first plurality of contacts couple to first differential receiver outputs, second differential receiver outputs, first differential transmitter inputs, and second differential transmitter inputs.

12. The method of claim 9, wherein the first signal is a control signal indicative of one of transmitter disable, receiver data rate selector, or transmitter data rate selector.

13. The method of claim 9, wherein the first signal is a status signal indicative of transmitter fault or receiver loss of signal (LOS).

14. An apparatus, comprising:
    an enhanced connector including a first plurality of contacts that correspond with all contacts of a standard type of electro-optical transceiver connector, the enhanced connector further comprising an additional contact at a space adjacent to the first plurality of contacts; and
    a tone generator coupled to the additional contact, the tone generator configured to receive a first signal indicative of a signal exchanged over the standard type of electro-optical transceiver connector and configured to generate a first distinct tone, indicative of the first signal, for transmission via the additional contact; and
    a tone detector configured to detect a distinct tone received via the additional contact and configured to generate a signal indicative of the distinct tone.

15. The apparatus of claim 14, wherein at least a portion of the first plurality of contacts couple to:
    first differential receiver outputs and second differential receiver outputs;
    first differential transmitter inputs and second differential transmitter inputs; or
    first differential receiver outputs, second differential receiver outputs, first differential transmitter inputs, and second differential transmitter inputs.

16. The apparatus of claim 14, wherein the first signal is a control signal indicative of transmitter disable, receiver data rate selector, or transmitter data rate selector, or wherein the first signal is a status signal indicative of transmitter fault or receiver loss of signal (LOS).

17. The apparatus of claim 14, wherein the first plurality of contacts and the additional contact are formed in a transceiver module or a host device.

18. A method comprising:

generating a first distinct tone indicative of a first signal indicative of a signal exchanged over a standard type of electro-optical transceiver connector, the first signal providing control or status of an apparatus configured to transmit or receive a differential data signal over a portion of a first plurality of contacts corresponding with all contacts of the standard type of electro-optical transceiver connector;

transmitting the first distinct tone over an additional contact in a space adjacent to the first plurality of contacts;

detecting a distinct tone received via the additional contact; and generating a signal indicative of the distinct tone.

19. The method of claim 18, wherein at least a portion of the first plurality of contacts couple to first differential receiver outputs, second differential receiver outputs, first differential transmitter inputs, and second differential transmitter inputs.

20. The method of claim 18, wherein the first signal is a control signal indicative of one of transmitter disable, receiver data rate selector, or transmitter data rate selector.

21. The method of claim 18, wherein the first signal is a status signal indicative of transmitter fault or receiver loss of signal (LOS).

* * * * *